L. L. HARDING.
CULTIVATOR.
APPLICATION FILED MAR. 12, 1920.

1,355,472.

Patented Oct. 12, 1920.
2 SHEETS—SHEET 1.

INVENTOR
L. L. Harding
BY
ATTORNEY

UNITED STATES PATENT OFFICE.

LEE L. HARDING, OF NEWINGTON, CONNECTICUT, ASSIGNOR TO THE NEW BRITAIN MACHINE COMPANY, OF NEW BRITAIN, CONNECTICUT, A CORPORATION OF CONNECTICUT.

CULTIVATOR.

1,355,472.      Specification of Letters Patent.      Patented Oct. 12, 1920.

Application filed March 12, 1920. Serial No. 365,157.

*To all whom it may concern:*

Be it known that I, LEE L. HARDING, a citizen of the United States, residing at Newington, in the county of Hartford and State of Connecticut, have invented certain new and useful Improvements in Cultivators, of which the following is a specification.

This invention relates to cultivators. The draft power for the cultivator may be supplied in any describable manner but preferably by a tractor. As a matter of fact one of the primary motives of the invention is to so connect the cultivating means with the tractor or other draft appurtenance that the operator can properly guide the tractor and at the same time raise or lower the cultivator when necessary to clear litter or to gage the penetration of the cultivator teeth into the soil. At the same time the cultivator as a unit may be raised clear of the ground at the end of a row. The teeth or hoes are of such a character as to make a favorable disposition of trash and foreign substances, these teeth or hoes being desirably adjustable to conform to the width of the rows being cultivated.

In the drawings accompanying and forming part of the present specification I have shown in detail one of the several forms of embodiment of the invention which to enable those skilled in the art to practice the same will be set forth fully in the following description. I am not restricted to this disclosure. I may depart therefrom in several respects within the scope of the invention defined by the claim following said description.

Referring to said drawings.

Like characters refer to like parts in both views.

Figure 1:
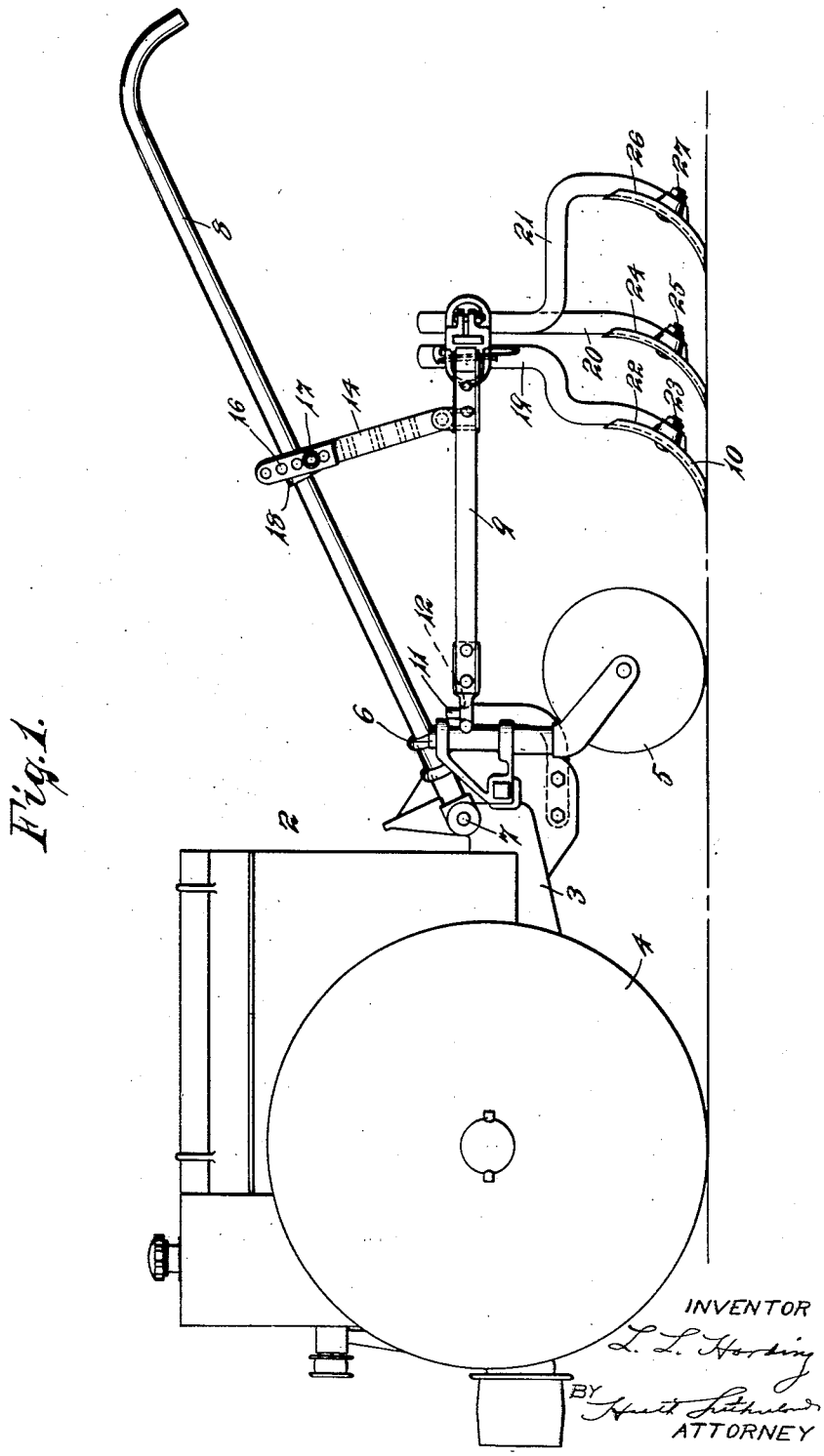
Figure 1 is a side elevation of the cultivator involving the invention.
Figure 2:
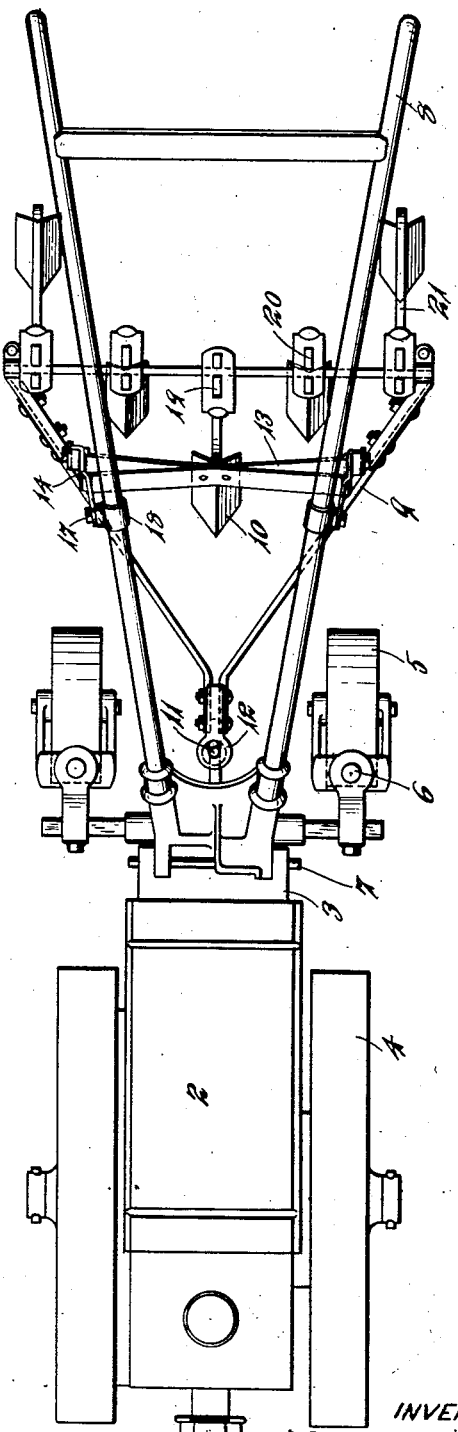
Fig. 2 is a top plan view of the same.

As I have indicated the draft appurtenance by which the cultivator is moved from point to point during its action may vary decidedly. For this purpose I have shown a tractor denoted in a general way by 2. The tractor comprises a body as 3 furnished with the wheels 4, the rear guide wheels 5 being connected to the rear side of the body 3 by the vertical pivots 6. There are flexibly connected with the rear part of the body as by the pivotal joints 7, the handles 8. The tractor 2 is what is known as a "walking tractor." In that shown the operator customarily stands practically between the rear ends of the handles 8 and grasps the handle ends.

As shown the cultivator comprises a frame as 9 with which the blades or hoes 10 are rigidly associated. The frame 9 is as shown of approximately equilateral triangular formation the forwardly converging sides meeting at a point intersected practically by the longitudinal median line of the tractor. Where these sides unite they are as shown pivotally connected with the tractor so that the cultivator may move vertically with respect to the tractor or body thereof and also permit the vertical adjustment of the cultivator. As represented the body 3 of the tractor at its rear end is shown furnished with an upstanding pivot or stud 11 extending somewhat freely through the eye 12 which as shown is at the extreme front end of the frame 9.

The forwardly converging sides of the frame 9 are as shown connected by the cross or tie bar 13 to which are rigidly connected adjusting bars 14. By raising or moving these adjusting bars 14, corresponding movements of the frame 9 may be effected. As shown the adjusting bars 14 have near their upper ends a series of superposed perforations 16 adapted to receive pins or bolts 17 by which the adjusting bars or straps 14 are connected to the clasps 18 united rigidly to the intermediate portions of the two handles 8. The construction described permits the ready vertical adjustment of the frame 9 and a corresponding motion of the blades or hoes which are rigidly associated with said frame. It will be clear that by lifting the handles 8 the frame 9 with its parts as a unit through the agency of adjusting bars 14, at this time acting as connecting straps can be lifted in its entirety.

The hoes or blades 10 are as shown in transverse rows although this is not a feature of importance, and they are connected to the shanks 19, 20 and 21. The bodies of these shanks are vertically adjustably connected near their upper ends with the rear cross bar of the frame 9. The front shanks 19 practically midway of their heights are bent forward and then downward, their lower portions being forwardly curved and having seats 22 to receive the upper portions of the bodies of the front blades or hoes 10 which are secured in position for instance by bolts 23. The intermediate shanks 20 have seats 24 to receive the bodies of the intermediate series of hoes or blades 10 held in place by bolts 25 duplicates of the bolts 23. The rearmost shanks 21 are projected rearwardly and then downwardly having seats 26 on their front sides to receive the shanks or bodies of the rearmost hoes 10 held in place by bolts in the manner already described. It will be noted that the sides of the hoes or blades 10 converge to a point, this having been found by me to be, an advantageous way of forming them.

What I claim is:

A cultivator adapted to be coupled to a tractor, having rearwardly-extending handles, comprising a substantially equilateral triangular frame, the rear end bar of the frame extending transversely of the tractor and having blades rigidly connected therewith, the side bars where they converge having means to flexibly connect the frame with the tractor, a cross bar between the side bars of the frame, adjusting bars pivoted at their lower ends to the cross bar where it is united with the side bars of the frame and each of the adjusting bars having a line of perforations at the other end, clasps to be connected with the handles of the tractor, and bolts to interchangeably enter the perforations of the respective adjusting bars and connected with the respective clasps.

In testimony whereof I affix my signature in the presence of two witnesses.

LEE L. HARDING.

Witnesses:
 ROBT. S. BROWN,
 MARY M. FITZ GERALD.